US009217120B2

(12) United States Patent
Bhaggan et al.

(10) Patent No.: US 9,217,120 B2
(45) Date of Patent: Dec. 22, 2015

(54) METHOD OF TREATING A VEGETABLE OIL

(71) Applicant: Loders Croklaan B.V., AZ Wormerveer (NL)

(72) Inventors: Krishnadath Bhaggan, AZ Wormerveer (NL); Jeanine Luvelle Werleman, AZ Wormerveer (NL); Johan Franx, AZ Wormerveer (NL)

(73) Assignee: Loders Croklann B.V., AZ Wormerveer (NL)

( * ) Notice: Subject to any disclaimer, the term of this patent is extended or adjusted under 35 U.S.C. 154(b) by 0 days.

(21) Appl. No.: 14/367,155

(22) PCT Filed: Dec. 21, 2012

(86) PCT No.: PCT/EP2012/076834
§ 371 (c)(1),
(2) Date: Jun. 19, 2014

(87) PCT Pub. No.: WO2013/093093
PCT Pub. Date: Jun. 27, 2013

(65) Prior Publication Data
US 2014/0357882 A1    Dec. 4, 2014

(30) Foreign Application Priority Data

Dec. 23, 2011   (EP) .................................... 11195694

(51) Int. Cl.
| C11B 3/10 | (2006.01) |
| C11C 1/10 | (2006.01) |
| C11B 3/14 | (2006.01) |
| C11C 1/08 | (2006.01) |
| A23L 1/015 | (2006.01) |

(52) U.S. Cl.
CPC ... *C11B 3/10* (2013.01); *C11B 3/14* (2013.01); *C11C 1/08* (2013.01); *C11C 1/10* (2013.01); *A23L 1/015* (2013.01)

(58) Field of Classification Search
CPC ............ C11B 3/001; C11B 3/04; C11B 3/10; C11B 3/14; C11C 1/10
See application file for complete search history.

(56) References Cited

U.S. PATENT DOCUMENTS

| 4,588,745 A | 5/1986 | Bessler | |
| 4,681,768 A | 7/1987 | Mulflur et al. | |
| 2012/0238770 A1* | 9/2012 | Bloomer et al. | 554/223 |
| 2012/0258232 A1* | 10/2012 | Kase et al. | 426/601 |
| 2012/0259133 A1* | 10/2012 | Homma et al. | 554/227 |

FOREIGN PATENT DOCUMENTS

| EP | 0 936 266 A1 | 8/1999 | |
| EP | 1 166 644 A1 | 1/2002 | |
| EP | 2 514 813 A1 | 10/2012 | |
| WO | WO 2010/063450 A1 | 6/2010 | |
| WO | WO 2010/126136 A1 | 11/2010 | |
| WO | WO 2011/002275 A1 | 1/2011 | |
| WO | WO 2011/005081 A1 | 1/2011 | |
| WO | WO 2011/009841 A1 | 1/2011 | |
| WO | WO 2011/009843 A1 | 1/2011 | |
| WO | WO 2011069028 | * 6/2011 | ............... A23D 9/02 |
| WO | WO 2012/065790 A1 | 5/2012 | |

OTHER PUBLICATIONS

Craft, B.D., et al., "Glycidyl esters in refined palm (*Elaeis guineensis*) oil and related fractions. Part II: Practical recommendations for effective mitigation," Food Chemistry, 132:73-79 (2012).

Franke, K., et al., "Influence of chemical refining process and oil type on bound 3-chloro-1,2-propanediol contents in palm oil and rapeseed oil," LWT-Food Science and Technology, 42:1751-1754 (2009).

Hamlet, C.G., et al., "Formation and occurrence of esters of 3-chloropropane-1,2-diol (3-CPD) in foods: What we know and what we assume," Eur. J. Lipid Sci. Technol., 113:279-303 (2011).

Hrncirik, K. and van Duijn, G., "An initial study on the formation of 3-MCPD esters during oil refining," Eur. J. Lipid Sci. Technol., 113:374-379 (2011).

Makhoukhi, B., et al., "Acid activation of Bentonite for use as a vegetable oil bleaching agent," Grasas y Aceites, 60(4):343-349 (2009).

Matthaus, B., et al., "Strategies for the reduction of 3-MCPD esters and related compunds in vegetable oils," Eur. J. Lipid Sci. Technol., 113:380-386 (2011).

Pudel, F., et al., "On the necessity of edible oil refining and possible sources of 3-MCPD and glycidyl esters," Eur. J. Lipid Sci. Technol., 113:368-373 (2011).

Ramli, M.R., et al., "Effects of Degumming and Bleaching on 3-MCPD Esters Formation During Physical Refining," J. Am. Oil Chem. Soc., 88:1839-1844 (2011).

Strijowski, U., et al., "Removal of 3-MCPD esters and related substances after refining by absorbent material," Eur. J. Lipid Sci. Technol., 113:387-392 (2011).

Weißhaar, R. And Perz, R., "Fatty acid esters of glycidol in refined fats and oils," Eur. J. Lipid Sci. Technol., 112:158-165 (2010).

Zelinkova, Z., et al., "Occurrence of 3-chloropropane-1,2-diol fatty acid esters in infant and baby foods," Eur Food Res Technol, 228:571-578 (2009).

International Search Report and Written Opinion of the International Searching Authority, International Application No. PCT/EP2012/076834, Entitled: "Method of Treating a Vegetable Oil", Dated: Apr. 18, 2013.

Notification Concerning Transmittal of International Preliminary Report on Patentability, International Application No. PCT/EP2012/076834, Entitled: "Method of Treating a Vegetable Oil", Dated: Jul. 3, 2014.

Weißhaar, R., "Editorial: 3-MCPD-esters in Edible Fats and Oils—A New and Worldwide Problem," Eur. J. Lipid Sci Technol. 110:671-672 (2008).

(Continued)

Primary Examiner — Yate K Cutliff
(74) *Attorney, Agent, or Firm* — Hamilton, Brook, Smith & Reynolds, P.C.

(57) ABSTRACT

A method of removing glycidyl esters from a vegetable oil comprises contacting the oil with at least 0.5% by weight of the oil of an acid-activated bleaching earth and deodorizing the oil at a temperature of less than 200° C. for a time of at least 30 minutes.

12 Claims, No Drawings

(56) References Cited

OTHER PUBLICATIONS

International Life Sciences Institute Handout at Europe Workshop in Association with the European Commission, "3-MCPD Esters in Food Products," Brussels, Belgium (Feb. 5-6, 2009). 133 pages.

Declaration of Krishnadath Bhaggan, Dated Jan. 29, 2014.

Larsen, J.C., "3-MCPD Esters in Food Products—Summary Report of a Workshop held in Feb. 2009 in Brussels, Belgium" International Life Sciences Institute's Europe Report Series, (Oct. 2009). 32 pages.

* cited by examiner

METHOD OF TREATING A VEGETABLE OIL

RELATED APPLICATIONS

This application is the U.S. National Stage of International Application No. PCT/EP2012/076834, filed Dec. 21, 2012, which designates the U.S., published in English, and claims priority under 35 U.S.C. §§119 or 365(c) to European Patent Application No. 11195694.2, filed Dec. 23, 2011.

This invention relates to a method treating a vegetable oil. In particular, the invention relates to a method of removing glycidyl esters from a vegetable oil.

Vegetable oils are used in many edible products and predominantly contain triglycerides of fatty acids. The oils are usually refined following their extraction from the naturally occurring source. Refining involves a number of steps such as bleaching, degumming and/or deodorising the oil. Crude palm oil is typically degummed, bleached and deodorised to produce a refined oil that is commercially useful for edible products.

Vegetable oils sometimes contain impurities. Some of these impurities can be introduced into the oil or generated in the oil itself during the refining process. For example, fatty acid esters of chloropropanediol and fatty acid esters of glycidol (2,3-epoxy-1-propanol) are known to be contaminants that can be present in refined oils and fats. These contaminants may be formed during refining.

Pudel et al, *Eur J Lipid Sci Technol*, 2011, 113, 368-373 describes the effect of various steps in the refining of edible oils on the formation of 3-monochloro-1,2-propanediol (3-MCPD), 3-MCPD esters (3-MCPD-E) and glycidyl esters (GE).

Ramli et al, *J Am Oil Chem Soc*, 2011, DOI 10.1007/s11746-011-1858-0, discloses the effects of degumming and bleaching on 3-MCPD ester formation during refining.

WO 2010/063450 relates to a method for reducing the 3-MCPD content in refined vegetable oils by treatment with a bleaching earth.

WO 2011/069028 describes various methods for reducing the amount of glycidyl esters in oils. When bleaching earths are used, the deodorisation step is carried out for a short time at a moderately high temperature. This is believed to have a detrimental effect on the final product and means that the method that is described cannot be used in practice. The oil will contain high levels of free fatty acids and monoglycerides as well as unpleasant odours, which will result in a product with unacceptable taste. Stability problems will also occur.

WO 2012/065790 (International Application No PCT/EP2011/067816) relates to a method for reducing or eliminating the presence of 3-MCPD and/or its esters in vegetable oils and foodstuffs containing them.

There remains a need for a process for removing glycidyl esters from vegetable oils that is practically useful on an industrial scale and that can provide an improved refined vegetable oil as the final product.

Accordingly, the invention provides a method of removing glycidyl esters from a vegetable oil comprising contacting the oil with at least 0.5% by weight of the oil of an acid-activated bleaching earth and deodorising the oil at a temperature of less than 200° C. for a time of at least 30 minutes.

The term "removing glycidyl esters", as used herein, refers to the partial, substantially complete or complete removal of glycidyl esters from the oil. Thus, the method of the invention may effect a reduction in the glycidyl ester content of the oil rather than complete removal. Preferably, the glycidyl ester content of the oil is reduced in the method of the invention to less than 10% (more preferably less than 5%) of the level that was present in the oil at the start of the method.

The vegetable oil that is used in the invention may be any vegetable oil. Suitable oils include palm oil, palm kernel oil, cocoa butter, cocoa butter substitutes, illipe fat, shea fat, canola oil, castor oil, coconut oil, coriander oil, corn oil, cottonseed oil, hazelnut oil, hempseed oil, linseed oil, mango kernel oil, olive oil, peanut oil, rapeseed oil, rice bran oil, safflower oil, soybean oil, and sunflower oil, and mixtures thereof. The oil may have been subjected to one or more refining steps including degumming, bleaching, deodorising and/or interesterification, such as by chemical or enzymatic treatment, prior to the method of the invention i.e., the oil is preferably refined. The oil may additionally have undergone other treatment steps such as fractionation, prior to the method of the invention. Preferably, the oil comprises one or more oils derived from palm. Oils derived from palm include palm oil, palm oil stearin, palm oil olein, palm kernel oil, palm kernel stearin and palm kernel olein, and interesterified products thereof. Preferably, the vegetable oil comprises palm oil or a fraction thereof. Palm oil fractions include palm oil oleins, palm oil stearins, palm mid-fractions and interesterified products thereof.

More preferably, the vegetable oil is (i.e., consists of) refined palm oil or a fraction thereof, such as palm oil olein or palm oil stearin.

The vegetable oil will typically have been subjected to one or more refining steps prior to the method of the invention. The glycidyl ester content of the oil prior to the method of the invention may be at least 0.5 ppm, such as at least 1 ppm, for example from 1 to 20 ppm, 2 to 15 ppm or 3 to 10 ppm. The glycidyl ester content of the oil before and after the method of the invention is determined according to the method described in the examples section below. The vegetable oil may also comprise 3-MCPD esters at a level of less than 10 ppm, such as from 1 to 8 ppm.

The method of the invention comprises, and may consist of, the steps of contacting the oil with an acid-activated bleaching earth and deodorising the oil. The step of contacting the oil with the acid-activated bleaching earth is carried out before or at the same time as the step of deodorising the oil, preferably before the deodorising step. Thus, deodorisation is preferably carried out on the oil after it has been treated with the bleaching earth.

In the step of contacting the oil with the acid-activated bleaching earth, the oil is preferably contacted with from 0.5% to 5% by weight of the oil of the acid-activated bleaching earth, such as from 0.5% to 2% by weight, more preferably from 0.7% to 1.8% by weight, for example from 1.1% to 1.7% by weight or from 1.4% to 1.6% by weight. These levels of bleaching earth, together with the lower deodorisation temperature and longer deodorisation time, are believed to contribute to producing an improved product having low levels of glycidyl esters as well as improved stability and taste desired in an edible oil, including low levels of free fatty acids. The longer deodorisation time reduces the taste of the oil as well as removing unstable peroxides to provide better storage stability.

The bleaching earth is acid-activated. Activation of natural bleaching earths by treatment with acid is well-known to those skilled in the art. Suitable bleaching earths are acid-activated clays, such as acid-activated bentonite and acid-activated montmorillonite. A preferred bleaching earth for use in the invention is acid-activated bentonite, for example the acid-activated calcium bentonite product Tonsil 115FF that is available from SCid Chemie AG. Tonsil 315FF is another suitable bleaching earth. Pure Flo Supreme 55 from Pure Flo is a further example of a suitable bleaching earth. Another preferred bleaching earth for use in the invention comprises silicon oxide, aluminium oxide, iron (III) oxide, magnesium oxide, calcium oxide, sodium oxide and potassium oxide, such as, for example, the product Taiko Classic Palm (available from Taiko Clay Marketing Sdn Bhd, Malaysia). Acid-activated bleaching earths may be used singly or as mixtures of two or more acid-activated bleaching earths.

Contacting the oil with the bleaching agent may be carried out in a number of ways. Preferably, the bleaching agent is added to the oil with stirring in a suitable vessel.

The bleaching earth is preferably added to the oil at a temperature of the oil of from 50 to 150° C., more preferably from 70 to 110° C., even more preferably from 80 to 100° C. Typically, the bleaching earth is added to the oil with stirring at this temperature.

The bleaching earth is typically contacted with the oil for a time of from 30 minutes to 2 hours, such as from 30 minutes to 1.5 hours or 35 minutes to 1 hour. This time of contact has been found to be effective for reducing the level of glycidyl esters in the oil.

Typically, the bleaching earth is contacted with the oil under a reduced pressure relative to atmospheric pressure (usually defined as 101.325 kPa). Preferably, the pressure during the step of contacting the bleaching earth with the oil is from 5 to 20 kPa (50 to 200 mbar).

Citric acid may be present with the oil during the bleaching step, such as in an amount of up to 0.1% by weight of the oil. Citric acid is typically added in the form of a solution.

Preferably, the bleaching earth is separated from the oil before the deodorising step. This can be achieved by, for example, filtering the mixture of oil and bleaching earth after the step of contacting the bleaching earth with the oil. Methods and apparatus for filtering a bleaching earth from a vegetable oil are well-known to those skilled in the art.

Deodorisation is a treatment of vegetable oils that removes (or reduces the content of) free fatty acids and other volatile compounds. Typically, deodorisation is carried out under reduced pressure in the presence of steam which strips off the fatty acids and other volatile compounds from the oil.

In the method of the invention, deodorisation is carried out at a relatively low temperature of less than 200° C. Preferred temperatures for the process of the invention are in the range of from 180° C. to 198° C. or from 185° C. to 195° C. It is believed that lower temperatures reduce the chances of reforming glycidyl esters in the product.

The deodorisation in the method of the invention is preferably carried out for at least 1 hour, more preferably for from 1 to 5 hours, such as from 2 to 4 hours. A deodorisation time of less than 30 minutes is believed to be too low to produce an acceptable product. It is also believed that a shorter deodorisation time will adversely affect the stability and shelf life of the product.

The deodorisation step is preferably carried out under a reduced pressure, more preferably at a pressure of from 0.05 to 5 kPa (0.5 to 50 mbar), even more preferably from 0.07 to 0.5 kPa (0.7 to 5 mbar).

In one particularly preferred aspect, the invention provides a method of removing glycidyl esters from a palm oil or a fraction thereof comprising contacting the oil with from 0.5% to 2% by weight of the oil of an acid-activated clay bleaching agent and deodorising the oil at a temperature of from 180 to 195° C. for a time of from 1 to 4 hours.

Typically, the method of the invention does not involve a chemical refining step.

The MCPD-E content of the oil is typically not reduced by more than 10% during the method of the invention and may even remain the same or increase by up to 30%, such as by up to 25%. The method of the invention therefore preferably exhibits a degree of selectivity for the removal of glycidyl esters compared to MCPD-E.

The method of the invention is preferably carried out on an industrial scale. In the context of the present invention, this means that the method forms a treated vegetable oil product at a rate of at least 10 kg per hour, either continuously or as a batch process.

The glycidyl esters that are removed from the oil, according to the invention, are esters of fatty acids i.e., C12-C24 straight chain saturated or unsaturated (including mono- and poly-unsaturated) carboxylic acids. Preferably, the fatty acids present in the glycidyl esters contain greater than 40% total palmitic and stearic acids and greater than 35% oleic acid (by weight of the total C12-C24 acids, present as the corresponding acyl groups)

The product of the invention preferably has a content of glycidyl esters of less than 2 ppm, more preferably less than 1 ppm, such as less than 0.5 ppm. The product preferably comprises at least 75% by weight of triglycerides of fatty acids. The product of the method of the invention is edible and may be used in a foodstuff. A typical product is a refined palm oil, palm oil olein or palm oil stearin having a content of glycidyl esters of less than 2 ppm, more preferably less than 1 ppm, such as less than 0.5 ppm. The product may also comprise 3-MCPD at a level of less than 10 ppm, such as from 1 to 8 ppm. The method of the invention may further comprise a step of reducing the 3-MCPD content of the product.

The following non-limiting examples illustrate the invention and do not limit its scope in any way. In the examples and throughout this specification, all percentages, parts and ratios are by weight unless indicated otherwise.

EXAMPLES

Method of Determining Glycidyl Ester Content

For the analysis of the sum of 3-MCPD esters (3-MCPD-E) and glycidyl esters (GE), DGF C-VI-18 (10) Part A (Chloride method) (DGF Standard Methods, 2011) is used. The results are reported as the sum of 3-MCPD derivatives (including free 3-MCPD+3-MCPD esters) and as glycidol derivatives, calculated as free 3-MCPD 433-MCPD-E+GE.

For the analysis of 3-MCPD-E, DGF C-VI-18 (10) Part B (Chloride free method) (DGF Standard Methods, 2011) is used. The results are reported as the sum of 3-MCPD derivatives (including free 3-MCPD+3-MCPD esters), calculated as free 3-MCPD→3-MCPD-E.

The difference of these two values gives GE content (a correction factor of 0.85 is used because of difference in molar mass, as described in the examples below).

Refining of Palm Oil

Crude palm oil is refined according to standard conditions used at factory scale and the level of 3-MCPD+GE is between 5 and 10 ppm while 3-MCPD-E content is between 3 and 4 ppm. When refined palm oil (RBD PO) is fractionated, both components are proportionally distributed to the olein and stearin fraction. The olein fraction has higher values than the stearin fraction.

In this experiment, the olein fraction was re-refined, where bleaching was carried out in a multipurpose reactor and the bleached oil was deodorized using a bench-top deodorizer at lab-scale.

Example 1

Palm olein (POflV55) was heated to 90° C., while stirring, and 1.5% (wt based on the weight of the olein) bleaching earth Tonsil 115FF (Slid Chemie) was added. While still stirring, the pressure was set to about 100 mbar and the suspension was stirred for an additional 45 minutes. After this, the vacuum was released and the bleaching earth was filtered off. The treated oil was then deodorized at 190° C. for 3 hours at a pressure of about 1 mbar.

Example 2

Example 1 was repeated but with a different bleaching earth; Taiko Classic Palm (Taiko Clay Marketing Sdn Bhd, Malaysia).

Results

The level of 3-MCPD-E+GE in the starting material POflV55 was about 9.54 ppm, while 3-MCPD-E content was 4.57 ppm. When this POflV55 was treated with Tonsil 115FF in Example 1, the sum of 3-MCPD-E+GE was reduced to 4.63 ppm, while the 3-MCPD-E remained at a level of 4.58 ppm. When this treated material was deodorized at 190° C., the sum of 3-MCPD-E+GE was 4.73 ppm, while 3-MCPD-E content was 4.39 ppm.

When Taiko Classic Palm bleaching earth was used in Example 2, the sum of 3-MCPD-E+GE in the bleaching earth treated material was reduced to 4.71 ppm, while the 3-MCPD-E was 4.69 ppm. When this material was deodorized at 190° C., the sum of 3-MCPD-E+GE was 4.68 ppm and the level of 3-MCPD-E was 4.58 ppm.

The difference between the sum of 3-MCPD-E+GE and 3-MCPD-E is proportional to glycidyl ester content. Due to the fact that glycidol has a lower molecular mass than 3-MCPD a stoichiometric factor has to be introduced. On the other hand the conversion of glycidol into 3-MCPD is not complete as by-products like glycerol or 2-MCPD may be generated in parallel. The empirically determined transformation rate seems to be somewhere around 0.8 to 0.9 and an average of 0.85 is used herein to determine GE quantitatively.

The results are summarized in table 1.

TABLE 1

Measured levels of 3-MCPD-E + GE in the post refined POflV55

|  | POflV55 | Bleaching earth treated | deodorized |
|---|---|---|---|
| Example 1 | | | |
| 3-MCPD-E + GE (ppm) | 9.54 | 4.63 | 4.73 |
| 3-MCPD-E (ppm) | 4.57 | 4.58 | 4.39 |
| GE (factor 0.85) | 4.22 | 0.04 | 0.29 |
| Example 2 | | | |
| 3-MCPD-E + GE (ppm) | 9.54 | 4.71 | 4.68 |
| 3-MCPD-E (ppm) | 4.57 | 4.69 | 4.58 |
| GE (factor 0.85) | 4.22 | 0.02 | 0.08 |

Example 3

Several refined oils were subjected to a post-refining process. The process was a physical refining process consisting of two steps i.e., bleaching and deodorization.

Bleaching

The oil (300 kg) was heated to 90° C., 0.1% (wt) of a 30% (wt) citric acid solution was added and the oil was stirred for 15 minutes at atmospheric pressure. After this, 0.15% (wt) demineralized water was added and the mixture was stirred for an additional 15 minutes. Thereafter, 1.5% (wt) of bleaching earth (Tonsil 315 FF) and 0.5% (wt) of filter aid was added and the oil was bleached at 100 mbar for 45 minutes. After bleaching, the oil was filtered to the deodorizer. A sample was removed for analysis.

Deodorization

The bleached oil was deodorized at 200° C. and about 5 mbar for 4 hrs. After this, the oil was cooled down to 60° C., at 120° C. 15 ppm citric acid was added, and tapped via a 1 m filter to a drum. A sample was removed for analysis.

Results

Table 2 below shows the results of 3-MCPD-E/GE analysis. The samples are analyzed by the DGF method (DGF C-VI-18 (10) Part A & B). Part A determines the sum of 3-MCPD-E and GE, while part B determines 3-MCPD-E (determined as 3-MCPD). The difference between A and B is proportional to glycidyl esters. When A is more or less equal to B, this means that no glycidyl ester is present or that it is present but in very low amounts (below detection limits).

TABLE 2

3-MCPD-E and sum of 3-MCPD-E/GE during post refining

| Oil | 3-MCPD-E + GE (ppm) | 3-MCPD-E (ppm) |
|---|---|---|
| RBD PO | 7.60 | 2.83 |
| Bleached RBD PO | 3.01 | 3.01 |
| Re-refined RBD PO | 2.89 | 2.76 |
| RBD palm olein IV 55 | 6.21 | 2.77 |
| Bleached RBD palm olein IV 55 | 2.86 | 2.83 |
| Re-refined RBD palm olein IV 55 | 2.90 | 2.74 |
| RBD palm stearine IV32 | 5.45 | 1.18 |
| Bleached RBD palm stearine IV32 | 1.29 | 1.23 |
| Re-refined RBD palm stearine IV32 | 1.63 | 1.49 |
| RBD palm stearine IV35 | 4.74 | 1.58 |
| Bleached RBD palm stearine IV35 | 1.62 | 1.60 |
| Re-refined RBD palm stearine IV35 | 1.71 | 1.63 |
| Crude palm olein IV 47 | 7.25 | 1.80 |
| Bleached palm olein IV 47 | 1.91 | 1.91 |
| Refined palm olein IV 47 | 2.33 | 2.22 |

In all products, the glycidyl esters are reduced during the post-refining process. In the fully refined product, the sum of 3-MCPD-E and GE is more or less equal to 3-MCPD-E which means that the GE is very low or below detection limit. A reduction of 53 to 70% of the sum of 3-MCPD-E+GE is achieved. Based on these results it can be concluded that 95-100% reduction of glycidyl esters was achieved.

Example 4

Post-Refining of POfiv64

Palm olein having an iodine value of 64 (POfiv64) was physically refined by applying the following conditions.

Bleaching was performed at 90° C. with 0.15% (wt) citric acid solution (30% (wt)) added and the mixture stirred for 15 minutes at atmospheric pressure. Then 0.15% (wt) water was added and the mixture stirred for 15 minutes at atmospheric pressure. 1.5% (wt) of acid-activated bleaching earth (Pure Flo Supreme 55 from Pure Flo having a pH of 3) and 1.5% filter aid were then added and bleached for 25 minutes at 700 mbar followed by 20 minutes at 100 mbar.

The bleached product was then deodorized at 180° C. for 5 hours using a bench top deodorizer. Samples were submitted for 3-MCPD-E and GE analysis.

TABLE 3

Measured levels of 3-MCPD-E + GE in the post refined POfiv55

| Example 4 | POfiv64 | Bleaching + Deodorizing |
|---|---|---|
| 3-MCPD-E (ppm) | 3.15 | 3.12 |
| GE (ppm) | 3.92 | <0.10 |

The invention claimed is:

1. Method of removing glycidyl esters from a vegetable oil which comprises palm oil or a fraction thereof, the method comprising contacting the oil with at from 0.5% to 5% by weight of the oil of an acid-activated bleaching earth and deodorizing the oil at a temperature of from 180 to 195° C. for a time of from 1 to 4 hours to form a product having a content of glycidyl esters of less than 0.5 ppm.

2. Method as claimed in claim 1, wherein the palm oil or fraction thereof is optionally interesterified.

3. Method as claimed in claim 1, wherein the vegetable oil is refined palm oil or a fraction thereof.

4. Method of claim 1, wherein the oil is a palm oil olein fraction.

5. Method of claim 1, wherein the oil is contacted with from 0.5% to 2% by weight of the oil of the acid-activated bleaching earth.

6. Method of claim 5, wherein the bleaching earth comprises or consists of an acid-activated clay.

7. Method of claim 6, wherein the bleaching earth is acid-activated calcium bentonite.

8. Method of claim 7, wherein the bleaching earth is added to the oil at a temperature of the oil of from 50 to 150° C.

9. Method of claim 8, wherein the bleaching earth is removed from the oil before the deodorizing step.

10. Method of claim 9, wherein the bleaching earth is contacted with the oil for a time of from 30 minutes to 2 hours.

11. Method of claim 10, wherein the bleaching earth is contacted with the oil under a reduced pressure of 5 to 20 kPa.

12. Method of claim 11, wherein the deodorization is carried out under a reduced pressure of 0.05 to 5 kPa.

* * * * *